United States Patent
Tanaka

(10) Patent No.: US 7,788,517 B2
(45) Date of Patent: Aug. 31, 2010

(54) CLUSTER SYSTEM AND METHOD OF CONTROLLING POWER-SUPPLY TO BLADE SERVERS INCLUDED IN CLUSTER SYSTEM

(75) Inventor: Yoshimasa Tanaka, Tokyo (JP)

(73) Assignee: NEC Corporation, Tokyo (JP)

(*) Notice: Subject to any disclaimer, the term of this patent is extended or adjusted under 35 U.S.C. 154(b) by 890 days.

(21) Appl. No.: 11/385,831

(22) Filed: Mar. 22, 2006

(65) Prior Publication Data

US 2006/0236140 A1 Oct. 19, 2006

(30) Foreign Application Priority Data

Mar. 29, 2005 (JP) .............................. 2005-094094

(51) Int. Cl.
*G06F 11/30* (2006.01)
(52) U.S. Cl. ....................... 713/340; 713/300
(58) Field of Classification Search ................. 713/300, 713/340
See application file for complete search history.

(56) References Cited

U.S. PATENT DOCUMENTS

| | | | | |
|---|---|---|---|---|
| 2002/0188718 A1* | 12/2002 | McGraw et al. | ............. | 709/224 |
| 2003/0037150 A1* | 2/2003 | Nakagawa | ............. | 709/229 |
| 2003/0065958 A1* | 4/2003 | Hansen et al. | ............. | 713/300 |
| 2004/0054780 A1 | 3/2004 | Romero | | |
| 2004/0174642 A1* | 9/2004 | Needham et al. | ............. | 361/18 |

FOREIGN PATENT DOCUMENTS

| JP | 5-40649 (A) | 2/1993 |
|---|---|---|
| JP | 5-236678 (A) | 9/1993 |
| JP | 6-202896 (A) | 7/1994 |
| JP | 2000-020336 A | 1/2000 |
| JP | 2001-331339 (A) | 11/2001 |
| JP | 2002-24050 (A) | 2/2002 |
| JP | 2002-136000 A | 5/2002 |
| JP | 2003-318782 (A) | 11/2003 |
| JP | 2004-110791 A | 4/2004 |
| JP | 2004-246439 A | 9/2004 |

OTHER PUBLICATIONS

Ryuta Mogi, Blade Server for Achieving High Availability of System, Nikkei Windows for IT Professionals, Jun. 2003, No. 75, pp. 14-17, Nikkei Business Publications.

* cited by examiner

*Primary Examiner*—Tse Chen
(74) *Attorney, Agent, or Firm*—Foley & Lardner LLP

(57) ABSTRACT

A cluster system includes a plurality of blade servers including at least one auxiliary blade server, the rest of the blade servers being used for actual operation of the cluster system, a power-supply unit supplying electrical power to each of the blade servers, a power-supply controller which controls on/off in supplying electrical power to each of the blade servers from the power-supply unit, and a blade server monitoring unit which monitors whether there occurs any trouble in each of the blade servers. The power-supply controller, when the blade server monitoring unit finds a trouble in any one of the blade servers, stops power-supply to a blade server in which the trouble was found, and turns the auxiliary blade server into a blade server to be used for actual operation of the cluster system, in place of the blade server in which the blade server monitoring unit found a trouble.

11 Claims, 4 Drawing Sheets

CLUSTER SYSTEM AND METHOD OF CONTROLLING POWER-SUPPLY TO BLADE SERVERS INCLUDED IN CLUSTER SYSTEM

BACKGROUND OF THE INVENTION

1. Field of the Invention

The invention relates to a cluster system including a plurality of blade servers, a method of controlling on/off in power-supply to a plurality of blade servers in a cluster system, and a program for causing a computer to cause the method.

2. Description of the Related Art

For instance, Japanese Patent Application Publication No. 2004-110791 has suggested a cluster system including a plurality of blade servers used for actual operation of the cluster system, and an administration server which monitors performance of each of the blade servers.

When the administration server finds that any one of the blade servers stalls, the administration server turns an auxiliary blade into a blade server to be used for actual operation of the cluster system, in place of the blade server in stall, keeping supplying electrical power to the blade system in stall.

Since an auxiliary blade server is turned into a blade server to be used for actual operation of the cluster system, unnecessarily keeping electrical power supplied to the blade server in stall, electrical power is consumed in vain, and it would be necessary for the cluster system to have power-supply ability more than necessary.

Japanese Patent Application Publication No. 2000-20336 has suggested a duplex communication system including a single main host used for actual operation of the communication system, a stand-by host which can make communication with the main host through a channel, and a memory storing data processed by the main host. In the duplex communication system, the main host transmits a signal indicative of occurrence of a trouble to the stand-by host through the channel. If the stand-by host cannot received the signal transmitted from the main host, and finds that the data stored in the memory is not updated, the main host is ceased to operate. Then, the stand-by host is caused to start operation thereof in place of the main host.

Japanese Patent Application Publication No. 2002-136000 has suggested an uninterruptive power supply system including a plurality of uninterruptive power supply devices each supplying electrical power to a plurality of components, and a controller which monitors and controls the uninterruptive power supply devices. Each of the uninterruptive power supply devices is associated with each of the components in dependence on a power supply redundancy predetermined for each of the components. Each of the uninterruptive power supply devices supplies electrical power at least to the associated component, and transmits a signal indicative of a condition of itself to the controller. The controller receives the signals from each of the uninterruptive power supply devices, and stops a certain uninterruptive power supply device or certain uninterruptive power supply devices to thereby supply electrical power.

Japanese Patent Application Publication No. 2004-246439 has suggested a cluster system including a plurality of hosts, and a controller to which each of the hosts is electrically connected. Each of the hosts includes means for exclusively controlling shared sources in communication with the controller, means for monitoring whether the shared source is locked, means for investigating a host and a process causing the shared source to be locked, and means for mandatorily ceasing the process which caused the shared source to be locked, to release the shared sources. The hosts cooperate with one another to identify a process causing the cluster system to stall, and mandatorily ceases the process.

SUMMARY OF THE INVENTION

In view of the above-mentioned problems in the conventional cluster system, it is an object of the present invention to provide a cluster system which makes it no longer necessary to unnecessarily supply electrical power to a blade server in stall when a trouble is found in the blade server.

It is also an object of the present invention to provide a method of controlling on/off in power-supply to a plurality of blade servers in a cluster system, which is capable of doing the same as the above-mentioned cluster system.

It is further an object of the present invention to provide a program for causing a computer to cause the method.

In one aspect of the present invention, there is provided a cluster system including a plurality of blade servers including at least one auxiliary blade server, the rest of the blade servers being used for actual operation of the cluster system, a power-supply unit capable of supplying electrical power to each of the blade servers, a power-supply controller which controls on/off in supplying electrical power to each of the blade servers from the power-supply unit, and a blade server monitoring unit which monitors whether there occurs any trouble in each of the blade servers, wherein the power-supply controller, when the blade server monitoring unit finds a trouble occurring in any one of the blade servers used for actual operation of the cluster system, stops power-supply to a blade server in which the blade server monitoring unit found a trouble, from the power-supply unit, and turns the auxiliary blade server or any one of auxiliary blade servers if the blade servers include two or more auxiliary blade servers, into a blade server to be used for actual operation of the cluster system, in place of the blade server in which the blade server monitoring unit found a trouble.

For instance, the power-supply controller keeps the auxiliary blade server in a cool stand-by condition until the blade server monitoring unit finds a trouble in any one of the blade servers, and, when the blade server monitoring unit found a trouble occurring in any one of the blade servers used for actual operation of the cluster system, starts supplying electrical power to the auxiliary blade server in place of the blade server in which the blade server monitoring unit found a trouble.

For instance, the power-supply controller keeps the auxiliary blade server in a hot stand-by condition before the blade server monitoring unit finds a trouble in any one of the blade servers.

It is preferable that the power-supply unit is comprised of a plurality of power-supply devices, in which case, the power-supply controller judges, assuming that a number of the blade servers used for actual operation of the cluster system is N, whether there is at least one power-supply device which does not supply electrical power to the blade servers when the power-supply unit supplies electrical power to the N blade servers, based on a number of the power-supply devices and a power-supply ability of the power-supply devices, when the power-supply controller judges that there is at least one power-supply device which does not supply electrical power to the blade servers when the power-supply unit supplies electrical power to the N blade servers, the power-supply controller keeps the auxiliary blade server in a hot stand-by condition before the blade server monitoring unit finds a trouble in any one of the blade servers, and when the power-supply controller does not judge that there is at least one power-supply device which does not supply electrical power to the blade servers when the power-supply unit supplies electrical power to the N blade servers, the power-supply controller keeps the auxiliary blade server in a cool stand-by condition before the blade server monitoring unit finds a trouble in any one of the blade servers, and, when the blade server monitoring unit found a trouble occurring in any one of the blade servers used for actual operation of the cluster system, starts supplying electrical power to the auxiliary blade server in place of the blade server in which the blade server monitoring unit found a trouble.

It is preferable that the power-supply unit is comprised of a plurality of power-supply devices, in which case, the power-supply controller groups the blade servers used for actual operation of the cluster system into at least two groups, and further groups the power-supply devices into groups in a number identical with a number of and in association with the groups of the blade servers used for actual operation of the cluster system, and the power-supply controller causes the power-supply device or devices belonging to a certain group to supply electrical power to the blade servers belonging to the associated group.

It is preferable that the power-supply unit is comprised of a plurality of power-supply devices, in which case, the power-supply controller causes each of the power-supply devices to supply electrical power to each of the blade servers used for actual operation of the cluster system.

It is preferable that the power-supply unit is comprised of a plurality of power-supply devices, in which case, the power-supply controller judges, assuming that a number of the blade servers used for actual operation of the cluster system is N, whether there is at least one power-supply device which does not supply electrical power to the blade servers when the power-supply unit supplies electrical power to the N blade servers, based on a number of the power-supply devices and a power-supply ability of the power-supply devices, when the power-supply controller does not judge that there is at least one power-supply device which does not supply electrical power to the blade servers when the power-supply unit supplies electrical power to the N blade servers, the power-supply controller causes the power-supply unit to supply electrical power to the blade servers used for actual operation of the cluster system in a first power-supply way in which the power-supply controller groups the blade servers used for actual operation of the cluster system into at least two groups, and further groups the power-supply devices into groups in a number identical with a number of and in association with the groups of the blade servers used for actual operation of the cluster system, and causes the power-supply device or devices belonging to a certain group to supply electrical power to the blade servers belonging to the associated group, when the power-supply controller judges that there is at least one power-supply device which does not supply electrical power to the blade servers when the power-supply unit supplies electrical power to the N blade servers, the power-supply controller causes the power-supply unit to supply electrical power to the blade servers used for actual operation of the cluster system in a second power-supply way in which the power-supply controller causes each of the power-supply devices to supply electrical power to each of the blade servers used for actual operation of the cluster system.

There is further provided a cluster system including a plurality of blade servers, a power-supply unit capable of supplying electrical power to each of the blade servers, and a power-supply controller which controls on/off in supplying electrical power to each of the blade servers from the power-supply unit, wherein the power-supply unit is comprised of a plurality of power-supply devices, the power-supply controller groups the blade servers into at least two groups, and further groups the power-supply devices into groups in a number identical with a number of and in association with the groups of the blade servers, and the power-supply controller causes the power-supply device or devices belonging to a certain group to supply electrical power to the blade servers belonging to the associated group.

There is further provided a cluster system including a plurality of blade servers, a power-supply unit capable of supplying electrical power to each of the blade servers, and a power-supply controller which controls on/off in supplying electrical power to each of the blade servers from the power-supply unit, wherein the power-supply unit is comprised of a plurality of power-supply devices, the power-supply controller causes each of the power-supply devices to supply electrical power to each of the blade servers.

There is further provided a cluster system including a plurality of blade servers, a power-supply unit capable of supplying electrical power to each of the blade servers, and a power-supply controller which controls on/off in supplying electrical power to each of the blade servers from the power-supply unit, wherein the power-supply unit is comprised of a plurality of power-supply devices, the power-supply controller judges, assuming that a number of the blade servers used for actual operation of the cluster system is N, whether there is at least one power-supply device which does not supply electrical power to the blade servers when the power-supply unit supplies electrical power to the N blade servers, based on a number of the power-supply devices and a power-supply ability of the power-supply devices, when the power-supply controller does not judge that there is at least one power-supply device which does not supply electrical power to the blade servers when the power-supply unit supplies electrical power to the N blade servers, the power-supply controller causes the power-supply unit to supply electrical power to the blade servers in a first power-supply way in which the power-supply controller groups the blade servers into at least two groups, and further groups the power-supply devices into groups in a number identical with a number of and in association with the groups of the blade servers, and causes the power-supply device or devices belonging to a certain group to supply electrical power to the blade servers belonging to the associated group, when the power-supply controller judges that there is at least one power-supply device which does not supply electrical power to the blade servers when the power-supply unit supplies electrical power to the N blade servers, the power-supply controller causes the power-supply unit to supply electrical power to the blade servers in a second power-supply way in which the power-supply controller causes each of the power-supply devices to supply electrical power to each of the blade servers.

In still another aspect of the present invention, there is provided a method of controlling on/off in power-supply to a plurality of blade servers in a cluster system including a plurality of blade servers, and a power-supply unit capable of supplying electrical power to each of the blade servers, the plurality of blade servers including at least one auxiliary blade server, the rest of the blade servers being used for actual operation of the cluster system, the method including monitoring whether there occurs any trouble in each of the blade servers used for actual operation of the cluster system, when a trouble is found in any one of the blade servers used for actual operation of the cluster system, stopping power-supply to a blade server in which the trouble was found, and turning the auxiliary blade server or any one of auxiliary blade servers if the blade servers include two or more auxiliary blade servers, into a blade server to be used for actual operation of the cluster system, in place of the blade server in which the trouble was found.

The method may further include keeping the auxiliary blade server in a cool stand-by condition until the blade a trouble is found in any one of the blade servers used for actual operation of the cluster system, and when a trouble is found in any one of the blade servers used for actual operation of the cluster system, starting supplying electrical power to the auxiliary blade server in place of the blade server in which the trouble was found.

The method may further include keeping the auxiliary blade server in a hot stand-by condition before a trouble is found in any one of the blade servers used for actual operation of the cluster system.

It is preferable that the power-supply unit is comprised of a plurality of power-supply devices, in which case, the method may further include judging, assuming that a number of the blade servers used for actual operation of the cluster system is N, whether there is at least one power-supply device which does not supply electrical power to the blade servers when the power-supply unit supplies electrical power to the N blade servers, based on a number of the power-supply devices and a power-supply ability of the power-supply devices, when it is judged that there is at least one power-supply device which does not supply electrical power to the blade servers when the power-supply unit supplies electrical power to the N blade servers, keeping the auxiliary blade server in a hot stand-by condition before a trouble is found in any one of the blade servers used for actual operation of the cluster system, when it is not judged that there is at least one power-supply device which does not supply electrical power to the blade servers when the power-supply unit supplies electrical power to the N blade servers, keeping the auxiliary blade server in a cool stand-by condition before a trouble is found in any one of the blade servers used for actual operation of the cluster system, and when a trouble is found in any one of the blade servers used for actual operation of the cluster system, while keeping the auxiliary blade server in a cool stand-by condition, starting supplying electrical power to the auxiliary blade server in place of the blade server in which the trouble was found.

It is preferable that the power-supply unit is comprised of a plurality of power-supply devices, in which case, the method may further include causing the power-supply unit to supply electrical power to the blade servers in a first power-supply way in which the blade servers are grouped into at least two groups, and the power-supply devices are grouped into groups in a number identical with a number of and in association with the groups of the blade servers, and causing the power-supply device or devices belonging to a certain group to supply electrical power to the blade servers belonging to the associated group.

It is preferable that the power-supply unit is comprised of a plurality of power-supply devices, in which case, the method may further include causing the power-supply unit to supply electrical power to the blade servers in a second power-supply way in which each of the power-supply devices supplies electrical power to each of the blade servers.

It is preferable that the power-supply unit is comprised of a plurality of power-supply devices, in which case, the method may further include judging, assuming that a number of the blade servers used for actual operation of the cluster system is N, whether there is at least one power-supply device which does not supply electrical power to the blade servers when the power-supply unit supplies electrical power to the N blade servers, based on a number of the power-supply devices and a power-supply ability of the power-supply devices, when it is not judged that there is at least one power-supply device which does not supply electrical power to the blade servers when the power-supply unit supplies electrical power to the N blade servers, causing the power-supply unit to supply electrical power to the blade servers in a first power-supply way in which the blade servers are grouped into at least two groups, and the power-supply devices are grouped into groups in a number identical with a number of and in association with the groups of the blade servers, and causing the power-supply device or devices belonging to a certain group to supply electrical power to the blade servers belonging to the associated group, and when it is judged that there is at least one power-supply device which does not supply electrical power to the blade servers when the power-supply unit supplies electrical power to the N blade servers, causing the power-supply unit to supply electrical power to the blade servers in a second power-supply way in which each of the power-supply devices supplies electrical power to each of the blade servers.

There is further provided a method of controlling on/off in power-supply to a plurality of blade servers in a cluster system including a plurality of blade servers, and a power-supply unit capable of supplying electrical power to each of the blade servers, the power-supply unit being comprised of a plurality of power-supply devices, the method including judging, assuming that a number of the blade servers is N, whether there is at least one power-supply device which does not supply electrical power to the blade servers when the power-supply unit supplies electrical power to the N blade servers, based on a number of the power-supply devices and a power-supply ability of the power-supply devices, when it is not judged that there is at least one power-supply device which does not supply electrical power to the blade servers when the power-supply unit supplies electrical power to the N blade servers, causing the power-supply unit to supply electrical power to the blade servers in a first power-supply way in which the blade servers are grouped into at least two groups, and the power-supply devices are grouped into groups in a number identical with a number of and in association with the groups of the blade servers, and causing the power-supply device or devices belonging to a certain group to supply electrical power to the blade servers belonging to the associated group, and when it is judged that there is at least one power-supply device which does not supply electrical power to the blade servers when the power-supply unit supplies electrical power to the N blade servers, causing the power-supply unit to supply electrical power to the blade servers in a second power-supply way in which each of the power-supply devices supplies electrical power to each of the blade servers.

In still another aspect of the present invention, there is provided a program for causing a computer to carry out a method of controlling power-supply to a plurality of blade servers in a cluster system including a plurality of blade servers, and a power-supply unit capable of supplying electrical power to each of the blade servers, the plurality of blade servers including at least one auxiliary blade server, the rest of the blade servers being used for actual operation of the cluster system, wherein steps executed by the computer in accordance with the program includes monitoring whether there occurs any trouble in each of the blade servers used for actual operation of the cluster system, when a trouble is found in any one of the blade servers used for actual operation of the cluster system, stopping power-supply to a blade server in which the trouble was found, and turning the auxiliary blade server or any one of auxiliary blade servers if the blade servers include two or more auxiliary blade servers, into a blade server to be used for actual operation of the cluster system, in place of the blade server in which the trouble was found.

There is further provided a program for causing a computer to carry out a method of controlling power-supply to a plurality of blade servers in a cluster system including a plurality of blade servers, and a power-supply unit capable of supplying electrical power to each of the blade servers, the power-supply unit being comprised of a plurality of power-supply devices, wherein steps executed by the computer in accordance with the program includes judging, assuming that a number of the blade servers is N, whether there is at least one power-supply device which does not supply electrical power to the blade servers when the power-supply unit supplies electrical power to the N blade servers, based on a number of the power-supply devices and a power-supply ability of the power-supply devices, when it is not judged that there is at least one power-supply device which does not supply electrical power to the blade servers when the power-supply unit supplies electrical power to the N blade servers, causing the power-supply unit to supply electrical power to the blade servers in a first power-supply way in which the blade servers are grouped into at least two groups, and the power-supply devices are grouped into groups in a number identical with a number of and in association with the groups of the blade servers, and causing the power-supply device or devices belonging to a certain group to supply electrical power to the blade servers belonging to the associated group, and when it is judged that there is at least one power-supply device which does not supply electrical power to the blade servers when the power-supply unit supplies electrical power to the N blade servers, causing the power-supply unit to supply electrical power to the blade servers in a second power-supply way in which each of the power-supply devices supplies electrical power to each of the blade servers.

The advantages obtained by the aforementioned present invention will be described hereinbelow.

In accordance with the present invention, when a trouble occurs in any one of blade servers used for actual operation of a cluster system, power-supply to the troubled blade server is stopped, and an auxiliary blade server is turned into a blade server to be used for actual operation of the cluster system in place of the troubled blade server. Accordingly, even when a trouble occurs in any one of blade servers used for actual operation of a cluster system, it is no longer necessary to supply electrical power to a troubled blade server, avoiding waste of electrical power.

In accordance with the present invention, blade servers are grouped into at least two groups, and further a plurality of power-supply devices is into groups in a number identical with a number of and in association with the groups of the blade servers, and a power-supply device or devices belonging to a certain group is(are) caused to supply electrical power to the blade servers belonging to the associated group. Accordingly, it would be possible to effectively supply electrical power to the blade servers by virtue of a minimum power-supply ability of the power-supply devices. Hence, even if there occurs a trouble in any one of the power-supply devices, it would be possible to avoid all of the blade servers from stalling.

In accordance with the present invention, each of the power-supply devices may be designed to supply electrical power to each of the blade servers used for actual operation of the cluster system. Accordingly, it would be possible to effectively supply electrical power to the blade servers by virtue of a minimum power-supply ability of the power-supply devices. Hence, even if there occurs a trouble in any one of the power-supply devices, it would be possible to avoid the cluster system from stalling.

In accordance with the present invention, the power-supply unit is comprised of a plurality of power-supply devices. The power-supply controller judges, assuming that a number of the blade servers used for actual operation of the cluster system is N, whether there is at least one power-supply device which does not supply electrical power to the blade servers when the power-supply unit supplies electrical power to the N blade servers, based on a number of the power-supply devices and a power-supply ability of the power-supply devices. When the power-supply controller does not judge that there is at least one power-supply device which does not supply electrical power to the blade servers when the power-supply unit supplies electrical power to the N blade servers, the power-supply controller causes the power-supply unit to supply electrical power to the blade servers in a first power-supply way in which the power-supply controller groups the blade servers into at least two groups, and further groups the power-supply devices into groups in a number identical with a number of and in association with the groups of the blade servers, and causes the power-supply device or devices belonging to a certain group to supply electrical power to the blade servers belonging to the associated group. When the power-supply controller judges that there is at least one power-supply device which does not supply electrical power to the blade servers when the power-supply unit supplies electrical power to the N blade servers, the power-supply controller causes the power-supply unit to supply electrical power to the blade servers in a second power-supply way in which the power-supply controller causes each of the power-supply devices to supply electrical power to each of the blade servers. Thus, it is possible to supply electrical power to the blade servers in an appropriate way in dependence on a number of the power-supply devices. This ensures it possible to effectively supply electrical power to the blade servers by virtue of a minimum power-supply ability of the power-supply devices regardless of selection of either power-supply way among the first and second power-supply ways.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 1:
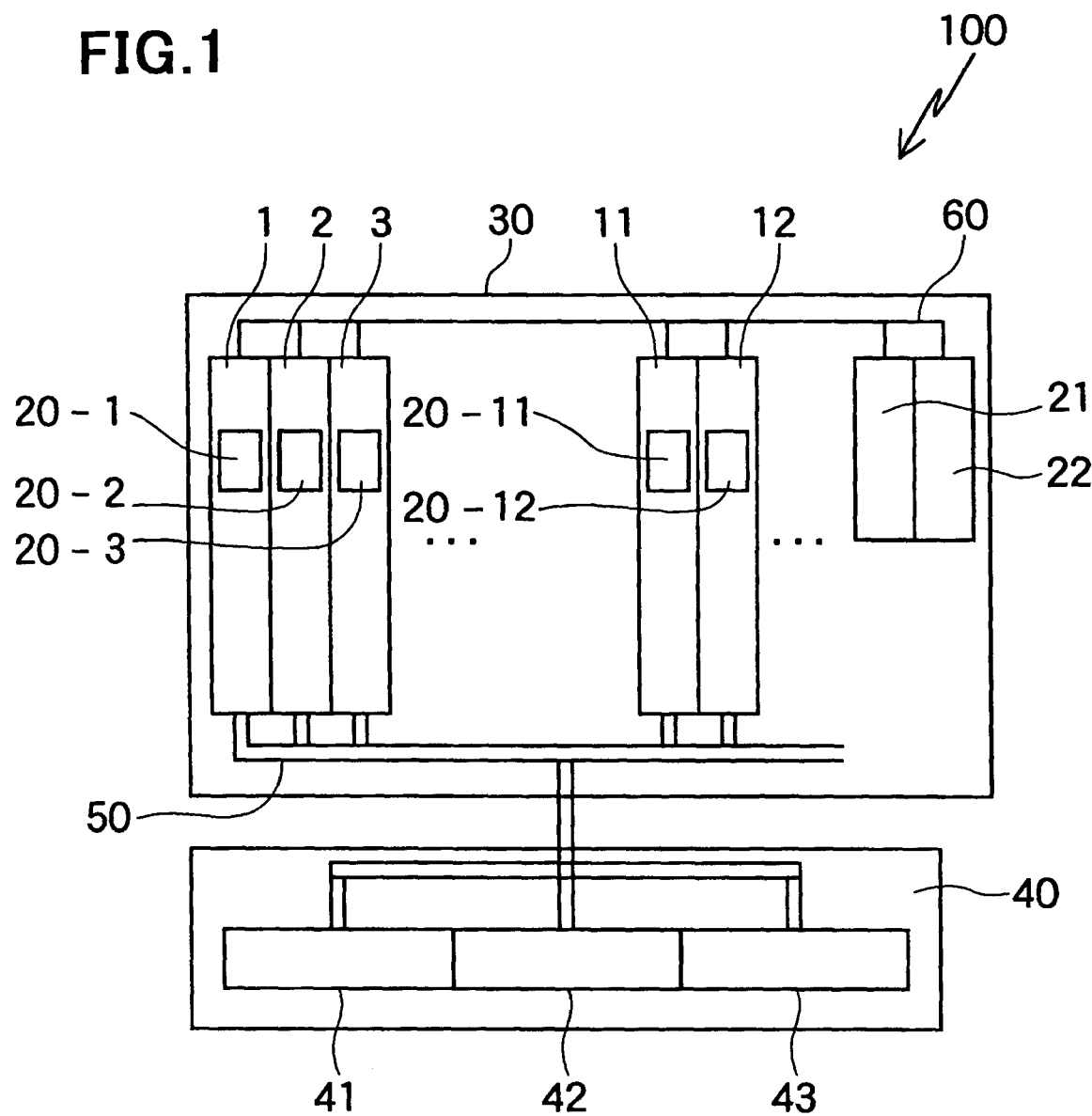
FIG. 1 is a schematic view of a cluster system in accordance with the first embodiment of the present invention.

FIG. 1 is a schematic view of a cluster system 100 in accordance with the first embodiment of the present invention.

As illustrated in FIG. 1, the cluster system 100 is comprised of a plurality of CPU blade servers 1, 2, 3, - - -, 11, 12, - - -, base management controllers (BMCs) 20-1, 20-2, 20-3, - - -, 20-11, 20-12, - - - equipped in the CPU blade servers 1, 2, 3, - - -, 11, 12, - - -, first and second chassis management modules (CMMs) 21 and 22 controlling operation of the CPU blade servers 1, 2, 3, - - -, 11, 12, - - - and the base management controllers 20-1, 20-2, 20-3, - - -, 20-11, 20-12, - - -, a blade server chassis 30 accommodating therein the CPU blade servers 1, 2, 3, - - -, 11, 12, - - - and the first and second chassis management modules 21 and 22, a plurality of distributed power supply modules (DPSs) 41, 42 and 43 each acting as a power-supply device, a power bay 40 accommodating the distributed power supply modules 41, 42 and 43 and acting as a power-supply unit, a back plane 50 through which each of the distributed power supply modules 41, 42 and 43 supplies electrical power to each of the CPU blade servers 1, 2, 3, - - -, 11, 12, - - -, and a signal line 60 electrically connecting therethrough the CPU blade servers 1, 2, 3, - - -, 11, 12, - - - and the first and second chassis management modules 21 and 22 with each other.

Among a plurality of the CPU blade servers 1, 2, 3, - - -, 11, 12, - - -, the PU blade servers 1, 2, 3, - - - are used for actual operation of the cluster system 100, and the CPU blade servers 11, 12, - - - are auxiliary blade servers. It should be noted that both a number of the CPU blade servers used for actual operation of the cluster system 100 and a number of the auxiliary CPU blade servers are arbitrary.

In the cluster system 100 in accordance with the first embodiment, the auxiliary CPU blade servers 11, 12, - - - are kept in a cool stand-by condition before any one of the CPU blade servers 1, 2, 3, - - - stalls. When any one of the CPU blade servers 1, 2, 3, - - - stalls, any one of the auxiliary CPU blade servers 11, 12, - - - is turned into a blade server to be used for actual operation of the cluster system 100.

Herein, a cool stand-by condition means a stand-by condition wherein electrical power is not supplied to the auxiliary CPU blade servers 11, 12, - - - . When any one of the CPU blade servers 1, 2, 3, - - - stalls, electrical power is supplied to any one of the auxiliary CPU blade servers 11, 12, - - - kept in a cool stand-by condition. The auxiliary CPU blade server to which electrical power is supplied starts up, and is put into such a condition that the operation system (OS) thereof is ready to operate. Thus, the auxiliary CPU blade server constitutes a part of the cluster system 100.

Each of the distributed power supply modules 41, 42 and 43 is designed to supply electrical power to one or more of the CPU blade servers 1, 2, 3, - - -, 11, 12, - - - through the back plane 50.

Though the cluster system 100 in accordance with the first embodiment, illustrated in FIG. 1, is designed to include three distributed power supply modules (DPSs) 41, 42 and 43, a number of the distributed power supply modules is not to be limited to three. In dependence on a number of the CPU blade servers 1, 2, 3, - - -, 11, 12, - - -, that is, in dependence on total power consumption of the CPU blade servers 1, 2, 3, - - -, 11, 12, - - -, an arbitrary number of distributed power supply modules may be equipped in the power bay 40.

Figure 2:
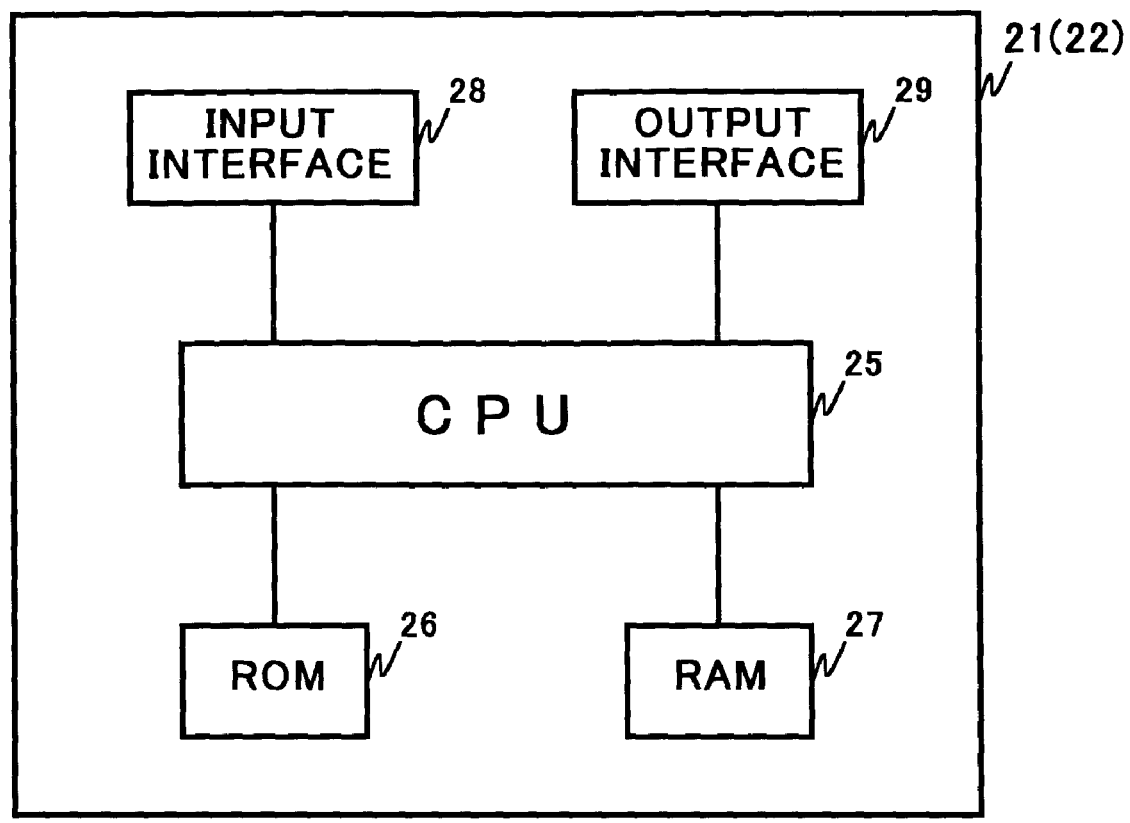
FIG. 2 is a block diagram of the chassis management module in the first embodiment.

FIG. 2 is a block diagram of each of the first and second chassis management modules 21 and 22.

As illustrated in FIG. 2, each of the first and second chassis management modules 21 and 22 is comprised of a central processing unit (CPU) 25, a first memory 26, a second memory 27, an input interface 28 through which a command and/or data is input into the central processing unit 25, and an output interface 29 through which a result of steps having been executed by the central processing unit 25 is output.

Each of the first and second memories 26 and 27 is comprised of a semiconductor memory such as a read only memory (ROM), a random access memory (RAM) or an IC memory card, or a storage device such as a flexible disc, a hard disc or an optic magnetic disc.

In the first embodiment, the first memory 26 comprises a read only memory (ROM), and the second memory 27 comprises a random access memory (RAM).

The first memory 26 stores therein a program for causing a computer to carry out a method of controlling on/off in power-supply to the CPU blade servers 1, 2, 3, - - -, 11, 12, - - - in the cluster system 100. The second memory 27 stores therein various data and parameters, and presents a working area to the central processing unit 25. The central processing unit 25 reads the program out of the first memory 26, and executes the program. Thus, the central processing unit 25 operates in accordance with the program stored in the first memory 26.

The cluster system 100 is designed to include two chassis management modules, that is, the first and second chassis management modules 21 and 22 by way of precaution against a trouble. When both of the first and second chassis management modules 21 and 22 are in no trouble, the first chassis management module 21 operates. If the first chassis management module 21 is troubled, the second chassis management module 22 operates in place of the first chassis management module 21.

Among the first and second chassis management modules 21 and 22, the chassis management module in operation (for instance, the first chassis management module 21) controls on/off in power-supply to the CPU blade servers 1, 2, 3, - - -, 11, 12, - - -.

Further, the chassis management module in operation (for instance, the first chassis management module 21) monitors whether there occurs a trouble in each of the base management controllers 20-1, 20-2, 20-3, - - -, 20-11, 20-12, - - -. For instance, the chassis management module in operation (for instance, the first chassis management module 21) monitors whether any one of the base management controllers 20-1, 20-2, 20-3, - - -, 20-11, 20-12, - - - stalls.

Further, when each of the CPU blade servers 1, 2, 3, - - -, 11, 12, - - - is put into the blade server chassis 30, the chassis management module in operation (for instance, the first chassis management module 21) recognizes it through the signal line 60.

On receipt of a command of supplying electrical power to any one or more of the CPU blade servers 1, 2, 3, - - -, 11, 12, - - -, through an input device (not illustrated), the chassis management module in operation (for instance, the first chassis management module 21) transmits a command signal to the base management controller(s) equipped in the designated CPU blade server(s) to receive electrical power from the distributed power supply modules (DPSs) 41, 42 and 43.

On receipt of the command signal, the base management controller(s) causes the CPU blade server(s) to receive electrical power and start up in accordance with a predetermined sequence.

Thus, the CPU blade server(s) is in a condition for receiving electrical power from any one or more of the distributed power supply modules (DPSs) 41, 42 and 43 through the back plane 50, and starting up.

Each of the base management controllers 20-1, 20-2, 20-3, - - -, 20-11, 20-12, - - - monitors whether there occurs a trouble in the associated CPU blade servers 1, 2, 3, - - -, 11, 12, - - -, and transmits a signal indicative of the monitoring result to the chassis management module in operation (for instance, the first chassis management module 21). For instance, each of the base management controllers 20-1, 20-2, 20-3, - - -, 20-11, 20-12, - - - monitors whether the associated CPU blade servers 1, 2, 3, - - -, 11, 12, - - - stall.

Hereinbelow is explained an operation of the cluster system 100 to be carried out when any one of the CPU blade servers 1, 2, 3, - - - used for actual operation of the cluster system 100 stalls.

It is assumed that the cluster system 100 is operated by the CPU blade servers 1, 2, 3, - - -, and performance of the operation system (OS) is accomplished. It is further assumed that the first chassis management module 21 is in operation among the first and second chassis management modules 21 and 22.

At this stage, any one or more of the distributed power supply modules (DPSs) 41, 42 and 43 supplies electrical power to the CPU blade servers 1, 2, 3, - - - used for actual operation of the cluster system 100, but does not supply electrical power to the auxiliary CPU blade servers 11, 12, - - -.

It is now assumed that any one of the CPU blade servers 1, 2, 3, - - - used for actual operation of the cluster system 100 stalls, for instance, the CPU blade server 1 stalls.

If the CPU blade server 1 stalls, the base management controller 20-1 equipped in the CPU blade server 1 knows that the CPU blade server 1 has stalled, and transmits a signal indicating that the CPU blade server 1 has stalled, to the first chassis management module 21.

On receipt of the signal, the first chassis management module 21 transmits a command to the base management controller 20-1 equipped in the CPU blade server 1 to mandatorily stop electrical power supply to the CPU blade server 1.

Then, the first chassis management module 21 turns any one of the auxiliary CPU blade servers 11, 12, - - - into a blade server used for actual operation of the cluster system 100, in place of the stalling CPU blade server 1. For instance, the first chassis management module 21 turns the auxiliary CPU blade server 11 into a blade server used for actual operation of the cluster system 100.

Specifically, the first chassis management module 21 transmits a command signal to the base management controller 20-11 equipped in the auxiliary CPU blade server 11 such that the auxiliary CPU blade server 11 receives electrical power from any one or more of the distributed power supply modules (DPSs) 41, 42 and 43 to start up.

When the auxiliary CPU blade server 11 starts up, the first chassis management module 21 reconstructs the cluster system including the auxiliary CPU blade server 11.

Now the cluster system 100 is operated by the CPU blade servers 11, 2, 3, - - -. Accordingly, performance of the operation system (OS) can be accomplished in the same way as a way in which the cluster system 100 was operated by the CPU blade servers 1, 2, 3, - - -.

In the first embodiment, it is assumed that the CPU blade server 1 stalls among the CPU blade servers 1, 2, 3, - - - used for actual operation of the cluster system 100. It should be noted that even when any one of the CPU blade servers 2, 3, - - - used for actual operation of the cluster system 100 stalls, the cluster system 100 operates in the same way as the above-mentioned first embodiment.

In the first embodiment, it is assumed that the auxiliary CPU blade server 11 is turned into a CPU blade server used for actual operation of the cluster system 100, when the CPU blade server 1 stalls. It should be noted that any one of the auxiliary CPU blade servers 12, 13, - - - may be turned into a CPU blade server used for actual operation of the cluster system 100, when the CPU blade server 1 stalls.

When the cluster system 100 is designed to include a plurality of the auxiliary CPU blade servers like the first embodiment, even if the CPU blade server 11 which was turned into a blade server used for actual operation of the cluster system 100, from an auxiliary CPU blade server stalls, any other auxiliary CPU blade server (for instance, the auxiliary CPU blade server 12) may be turned into a blade server used for actual operation of the cluster system 100.

Hereinbelow is explained an operation of the cluster system 100 to be carried out when any one of the base management controllers 20-1, 20-2, 20-3, - - -, 20-11, 20-12, - - - stalls.

It is assumed that the cluster system 100 is operated by the CPU blade servers 1, 2, 3, - - -, and performance of the operation system (OS) is accomplished. It is further assumed that the first chassis management module 21 is in operation among the first and second chassis management modules 21 and 22.

At this stage, any one or more of the distributed power supply modules (DPSs) 41, 42 and 43 supplies electrical power to the CPU blade servers 1, 2, 3, - - - used for actual operation of the cluster system 100, but does not supply electrical power to the auxiliary CPU blade servers 11, 12, - - -.

It is now assumed that any one of the base management controllers 20-1, 20-2, 20-3, - - - associated with the CPU blade servers 1, 2, 3, - - - used for actual operation of the cluster system 100 stalls, for instance, the base management controller 20-1 associated with the CPU blade server 1 stalls.

If the base management controller 20-1 stalls, the first chassis management module 21 knows that the base management controller 20-1 has stalled, and mandatorily stops electrical power supply to the base management controller 20-1 equipped in the CPU blade server 1.

Then, the first chassis management module 21 turns any one of the auxiliary CPU blade servers 11, 12, - - - into a blade server used for actual operation of the cluster system 100, in place of the CPU blade server 1 including the base management controller 20-1 which has stalled. For instance, the first chassis management module 21 turns the auxiliary CPU blade server 11 into a blade server used for actual operation of the cluster system 100.

Specifically, the first chassis management module 21 transmits a command signal to the base management controller 20-11 equipped in the auxiliary CPU blade server 11 such that the auxiliary CPU blade server 11 receives electrical power from any one or more of the distributed power supply modules (DPSs) 41, 42 and 43 to start up.

When the auxiliary CPU blade server 11 starts up, the first chassis management module 21 reconstructs the cluster system including the auxiliary CPU blade server 11.

Now the cluster system 100 is operated by the CPU blade servers 11, 2, 3, - - -. Accordingly, performance of the operation system (OS) can be accomplished in the same way as a way in which the cluster system 100 was operated by the CPU blade servers 1, 2, 3, - - -.

In the first embodiment, it is assumed that the base management controller 20-1 associated with the CPU blade server 1 stalls among the base management controller 20-1, 20-2, 20-3, - - - associated with the CPU blade servers 1, 2, 3, - - - used for actual operation of the cluster system 100. It should be noted that even when any one of the base management controller 20-2, 20-3, - - - associated with the CPU blade servers 2, 3, - - - used for actual operation of the cluster system 100 stalls, the cluster system 100 operates in the same way as the above-mentioned first embodiment.

In the first embodiment, it is assumed that the auxiliary CPU blade server 11 is turned into a CPU blade server used for actual operation of the cluster system 100, when the base management controller 20-1 associated with the CPU blade server 1 stalls. It should be noted that any one of the auxiliary CPU blade servers 12, 13, - - - may be turned into a CPU blade server used for actual operation of the cluster system 100, when the base management controller 20-1 associated with the CPU blade server 1 stalls.

When the cluster system 100 is designed to include a plurality of the auxiliary CPU blade servers, even if the base management controller associated with the CPU blade server 11 which was turned into a blade server used for actual operation of the cluster system 100, from an auxiliary CPU blade server stalls, any other auxiliary CPU blade server (for instance, the auxiliary CPU blade server 12) may be turned into a blade server used for actual operation of the cluster system 100.

In accordance with the above-mentioned first embodiment, when any one of the CPU blade servers 1, 2, 3, - - - used for actual operation of the cluster system 100 (for instance, the CPU blade server 1) stalls, any one of the auxiliary CPU blade servers 11, 12, 13, - - - (for instance, the auxiliary CPU blade server 11) is turned into a blade server used for actual operation of the cluster system 100, in place of the stalling CPU blade server. Accordingly, even if any one of the CPU blade servers 1, 2, 3, - - - used for actual operation of the cluster system 100 stalls, the cluster system 100 can continuously operate.

Furthermore, since when any one of the CPU blade servers 1, 2, 3, - - - used for actual operation of the cluster system 100 (for instance, the CPU blade server 1) stalls, electrical power is supplied to any one of the auxiliary CPU blade servers 11, 12, 13, - - - (for instance, the auxiliary CPU blade server 11) after power-supply was stopped to the stalling CPU blade server (for instance, the CPU blade server 1). Accordingly, even if any one of the CPU blade servers 1, 2, 3, - - - used for actual operation of the cluster system 100 stalls, it is no longer necessary to unnecessarily supply electrical power to the stalling CPU blade server, ensuring that a power-supply unit can be effectively utilized.

In addition, it is not necessary to prepare an auxiliary power supply to be used for the auxiliary CPU blade servers 11, 12, 13, - - -.

Similarly, when any one of the base management controllers 20-1, 20-2, 20-3, - - - associated with the CPU blade servers 1, 2, 3, - - - used for actual operation of the cluster system 100 (for instance, the base management controller 20-1 associated with the CPU blade server 1) stalls, any one of the auxiliary CPU blade servers 11, 12, 13, - - - (for instance, the auxiliary CPU blade server 11) is turned into a blade server used for actual operation of the cluster system 100, in place of the CPU blade serve including the stalling the base management controller. Accordingly, even if any one of the base management controllers 20-1, 20-2, 20-3, - - - associated with the CPU blade servers 1, 2, 3, - - - used for actual operation of the cluster system 100 stalls, the cluster system 100 can continuously operate.

Furthermore, since when any one of the base management controllers 20-1, 20-2, 20-3, - - - associated with the CPU blade servers 1, 2, 3, - - - used for actual operation of the cluster system 100 (for instance, the base management controller 20-1 associated with the CPU blade server 1) stalls, electrical power is supplied to any one of the auxiliary CPU blade servers 11, 12, 13, - - - (for instance, the auxiliary CPU blade server 11) after power-supply was stopped to the CPU blade server including the stalling base management controller (for instance, the CPU blade server 1 including the base management controller 20-1). Accordingly, even if any one of the base management controllers 20-1, 20-2, 20-3, - - - associated with the CPU blade servers 1, 2, 3, - - - used for actual operation of the cluster system 100 stalls, it is no longer necessary to unnecessarily supply electrical power to the CPU blade server including the stalling base management controller, ensuring that a power-supply unit can be effectively utilized.

In addition, it is not necessary to prepare an auxiliary power supply to be used for the auxiliary CPU blade servers 11, 12, 13, - - -.

Second Embodiment

In the above-mentioned first embodiment, the auxiliary CPU blade servers 11, 12, 13, - - - are kept in a cool stand-by condition. In contrast, in the second embodiment, if the distributed power supply modules (DPSs) 41, 42 and 43 ensure (N+1) redundancy wherein N indicates a number of the CPU blade servers used for actual operation of the cluster system 100, that is, if there is at least one distributed power supply module which does not supply electrical power to the N CPU blade servers when electrical power is supplied to all of the N CPU blade servers, at least one of the auxiliary CPU blade servers 11, 12, 13, - - - is kept in a hot stand-by condition.

In the second embodiment, it is assumed that before there occurs a trouble in any one of the CPU blade servers 1, 2, 3, - - - used for actual operation of the cluster system 100, the distributed power supply modules (DPSs) 41 and 42 supply electrical power to the CPU blade servers 1, 2, 3, - - -.

The distributed power supply module (DPS) 43 supplies electrical power to one or more of the auxiliary CPU blade servers 11, 12, 13, - - - to keep at least one of the auxiliary CPU blade servers 11, 12, 13, - - - in a hot stand-by condition.

A hot stand-by condition means a condition in which electrical power is supplied to an auxiliary CPU blade server, and hence, the operation system (OS) is ready to operate.

When any one of the CPU blade servers 1, 2, 3, - - - used for actual operation of the cluster system 100 stalls, the auxiliary CPU blade server kept in a hot stand-by condition is incorporated into the cluster system 100.

The second embodiment is identical with the above-mentioned first embodiment except that before there occurs a trouble in any one of the CPU blade servers 1, 2, 3, - - - used for actual operation of the cluster system 100, at least one of the auxiliary CPU blade servers 11, 12, 13, - - - is kept in a hot stand-by condition.

In accordance with the second embodiment, the same advantages as those obtained by the above-mentioned first embodiment can be obtained. Furthermore, since at least one of the auxiliary CPU blade servers 11, 12, 13, - - - is kept in a hot stand-by condition before there occurs a trouble in any one of the CPU blade servers 1, 2, 3, - - - used for actual operation of the cluster system 100, it would be possible to rapidly turn an auxiliary CPU blade server into a blade server used for actual operation of the cluster system 100, and reconstruct the cluster system including the auxiliary CPU blade server having been turned from a blade server used for actual operation of the cluster system 100.

Third Embodiment

In the third embodiment, each of the first and second chassis management modules 21 and 22 is designed to select a first power-supply way in which the auxiliary CPU blade servers 11, 12, 13, - - - are kept in a cool stand-by condition or a second power-supply way in which the auxiliary CPU blade servers 11, 12, 13, - - - are kept in a hot stand-by condition.

In order for the first and second chassis management modules 21 and 22 to be able to select the first or second power-supply way, each of the first and second chassis management modules 21 and 22 is designed to be able to check whether the distributed power supply modules (DPSs) 41, 42 and 43 construct (N+1) redundancy wherein N indicates a number of the CPU blade servers used for actual operation of the cluster system 100.

Specifically, the chassis management module in operation (for instance, the first chassis management module 21) judges whether there is at least one distributed power supply module 41, 42 or 43 which does not supply electrical power to the CPU blade servers 1, 2, 3, - - - used for actual operation of the cluster system 100, when electrical power is supplied to all of the CPU blade servers 1, 2, 3, - - -.

The chassis management module in operation makes the above-mentioned judgment in accordance with a number of the distributed power supply modules, a power-supply ability of the distributed power supply modules 41-43, and a number of the CPU blade servers 1, 2, 3, - - - used for actual operation of the cluster system 100.

If the chassis management module in operation (for instance, the first chassis management module 21) judges that the distributed power supply modules (DPSs) 41, 42 and 43 construct (N+1) redundancy, that is, there is at least one distributed power supply module 41, 42 or 43 which does not supply electrical power to the CPU blade servers 1, 2, 3, - - - used for actual operation of the cluster system 100, when electrical power is supplied to all of the CPU blade servers 1, 2, 3, - - -, the chassis management module in operation keeps the auxiliary CPU blade servers 11, 12, 13, - - - in a hot stand-by condition.

In contrast, if the chassis management module in operation (for instance, the first chassis management module 21) judges that the distributed power supply modules (DPSs) 41, 42 and 43 cannot construct (N+1) redundancy, that is, there is no distributed power supply module 41, 42 or 43 which does not supply electrical power to the CPU blade servers 1, 2, 3, - - - used for actual operation of the cluster system 100, when electrical power is supplied to all of the CPU blade servers 1, 2, 3, - - -, the chassis management module in operation keeps the auxiliary CPU blade servers 11, 12, 13, - - - in a cool stand-by condition.

Thus, the auxiliary CPU blade servers 11, 12, 13, - - - are kept in an appropriate stand-by condition among cool and hot stand-by conditions, in dependence on a redundancy of the distributed power supply modules (DPSs) 41, 42 and 43.

As mentioned earlier, the chassis management module in operation (for instance, the first chassis management module 21), each time the CPU blade servers 1, 2, 3, - - -, 11, 12, 13, - - - is put into the blade chassis 30, recognizes it through the signal line 60. For instance, the chassis management module in operation can know a total number of the CPU blade servers 1, 2, 3, - - -, 11, 12, 13, - - -, based on the recognition. That is, the chassis management module in operation counts the CPU blade servers 1, 2, 3, - - -, 11, 12, 13, - - -.

The chassis management module in operation monitors whether electrical power is supplied to each of the CPU blade servers 1, 2, 3, - - -, 11, 12, 13, - - -. Furthermore, the chassis management module in operation counts the CPU blade servers 1, 2, 3, - - -, 11, 12, 13, - - - to which electrical power is supplied.

The third embodiment is identical with the above-mentioned first and second embodiment except the above-different matters.

In accordance with the third embodiment, since the first and second chassis management modules 21 and 22 are designed to be able to judge a redundancy of the distributed power supply modules (DPSs) 41, 42 and 43, the first and second chassis management modules 21 and 22 can put the auxiliary CPU blade servers 11, 12, 13, - - - in an appropriate stand-by condition among hot and cool stand-by conditions in dependence on the redundancy of the distributed power supply modules (DPSs) 41, 42 and 43.

Specifically, if the distributed power supply modules (DPSs) 41, 42 and 43 has a power-supply ability more than necessary, the auxiliary CPU blade servers 11, 12, 13, - - - are kept in a hot stand-by condition, whereas if the distributed power supply modules (DPSs) 41, 42 and 43 has a power-supply ability just necessary for operating the CPU blade servers, the auxiliary CPU blade servers 11, 12, 13, - - - are kept in a cool stand-by condition.

Fourth Embodiment

Figure 3:
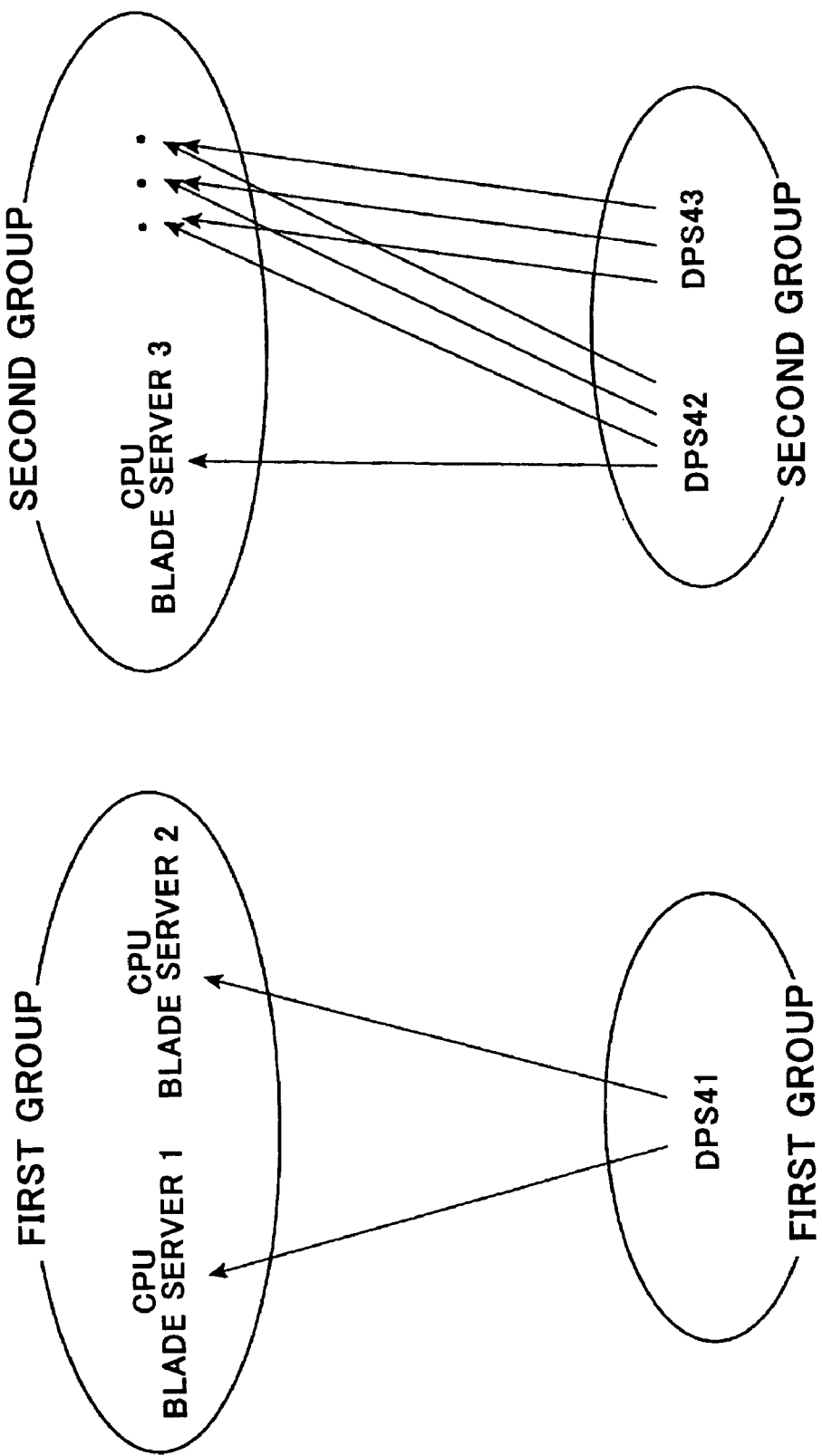
FIG. 3 is a schematic view illustrating power distribution in the fourth embodiment.

FIG. 3 is a schematic view illustrating power distribution in the fourth embodiment.

In the above-mentioned first to third embodiments, even if a trouble occurs in the CPU blade servers 1, 2, 3, - - - used for actual operation of the cluster system 100, it is possible to avoid the cluster system 100 from stalling. In contrast, in the fourth embodiment, even if a trouble occurs in any one of the distributed power supply modules (DPSs) 41, 42 and 43, it is possible to avoid the cluster system 100 from stalling.

In the fourth embodiment, the CPU blade servers 1, 2, 3, - - - used for actual operation of the cluster system 100 is grouped into a plurality of groups.

For instance, as illustrated in FIG. 3, the CPU blade servers 1, 2, 3, - - - used for actual operation of the cluster system 100 is grouped into a first group including the CPU blade servers 1 and 2, and a second group including the CPU blade servers 3, 4, 5, - - -.

Similarly, the distributed power supply modules 41, 42 and 43 are grouped into a plurality of groups in association with the groups of the CPU blade servers 1, 2, 3, - - - used for actual operation of the cluster system 100. Specifically, as illustrated in FIG. 3, the distributed power supply modules 41, 42 and 43 is grouped into a first group including the distributed power supply module 41, and a second group including the distributed power supply modules 42 and 43.

As illustrated in FIG. 3, the distributed power supply module 41 belonging to the first group supplies power to the CPU blade servers belonging to the associated group, that is, the CPU blade servers 1 and 2 belonging to the first group. The distributed power supply modules 42 and 43 belonging to the second group supply power to the CPU blade servers belonging to the associated group, that is, the CPU blade servers 3, 4, 5, - - - belonging to the second group.

Accordingly, even if there occurs a trouble in one of the first and second groups of the distributed power supply modules with the result of failure of supplying power to the CPU blade servers, the CPU blade servers receiving power from the other group of the distributed power supply modules can keep operating.

For instance, even if there occurs a trouble in the distributed power supply module 41 belonging to the first group, resulting in that electrical power cannot be supplied to the CPU blade servers 1 and 2 belonging to the first group, the CPU blade servers 3, 4, 5, - - - belonging to the second group can receive electrical power from the distributed power supply modules 42 and 43 belonging to the second group, and hence, can keep in operation.

If there occurs a trouble in the distributed power supply module 41 belonging to the first group, the CPU blade servers 1 and 2 belonging to the first group can no longer operate, resulting in deterioration in the performance of the cluster system 100. However, since the CPU blade servers 3, 4, 5, - - - belonging to the second group can receive electrical power from the distributed power supply modules 42 and 43 belonging to the second group, and hence, can keep in operation, it would be possible to avoid the cluster system 100 from completely stalling.

For instance, if there occurs a trouble in the distributed power supply module 42 belonging to the second group, though an ability to supply electrical power to the CPU blade servers 3, 4, 5, - - - belonging to the second group is reduced, the distributed power supply module 43 keeps supplying electrical power to the CPU blade servers 3, 4, 5, - - - belonging to the second group. Accordingly, it is possible to avoid the CPU blade servers 3, 4, 5, - - - belonging to the second group from completely stalling.

Furthermore, since the distributed power supply module 41 belonging to the first group keeps supplying electrical power to the CPU blade servers 1 and 2 belonging to the first group, the CPU blade servers 1 and 2 belonging to the first group can operate as usual.

Thus, even if there occurs a trouble in one of the first and second groups of the distributed power supply modules, through the performance of the cluster system 100 is locally deteriorated (for instance, only the second group of the CPU blade servers 3, 4, 5, - - - stall), it is possible to avoid the cluster system 100 from completely stalling, that is, to avoid all of the CPU blade servers 1, 2, 3, 4, 5, - - - used for actual operation of the cluster system 100 from stalling. In addition, the rest of the cluster system (for instance, the first group of the CPU blade servers 1 and 2) can keep in operation.

The above-mentioned first to third embodiments may be applied to the fourth embodiment. That is, even if there occurs a trouble in any one of the CPU blade servers 1, 2, 3, 4, 5, - - - used for actual operation of the cluster system 100, any one of the auxiliary the CPU blade servers 11, 12, - - - is used in place of the troubled CPU blade server.

In accordance with the fourth embodiment, the first and second chassis management modules 21 and 22 groups the CPU blade servers 1, 2, 3, 4, 5, - - - used for actual operation of the cluster system 100 into a plurality of groups, and further groups the distributed power supply modules 41 to 43 into a plurality of groups in association with the groups of the CPU blade servers 1, 2, 3, 4, 5, The distributed power supply modules belonging to a certain group supply electrical power to the CPU blade servers belonging to the associated group.

For instance, the CPU blade servers 1, 2, 3, 4, 5, - - - are grouped into the first group including the CPU blade servers 1 and 2, and the second group including the CPU blade servers 3, 4, 5, - - -, and the distributed power supply modules 41 to 43 are grouped into the first group including the distributed power supply module 41, and the second group including the distributed power supply modules 42 and 43. The distributed power supply module 41 belonging to the first group supplies electrical power to the CPU blade servers 1 and 2 belonging to the first group, and the distributed power supply modules 42 and 43 belonging to the second group supply electrical power to the CPU blade servers 3, 4, 5, - - - belonging to the second group.

Thus, only if the first and second chassis management modules 21 and 22 prepares a minimum power-supply ability, it would be possible to effectively supply electrical power to the CPU blade servers 1, 2, 3, 4, 5, - - -.

Even if there occurs a trouble in any of the first and second groups of the distributed power supply modules, though the performance of the cluster system 100 is deteriorated, it would be possible to avoid the cluster system 100 from completely stalling.

Furthermore, the cluster system 100 can operate as usual except the CPU blade servers associated with the troubled group of the distributed power supply modules.

Thus, the fourth embodiment presents the cluster system 100 which is capable of operating with less electrical power, having a resistance to troubles, and presenting high reliability.

The fourth embodiment is suitable to a case in which the distributed power supply modules 41 to 43 cannot construct (N+1) redundancy for the CPU blade servers 1, 2, 3, 4, 5, - - -, that is, there is no distributed power supply module which does not supply electrical power to the CPU blade servers 1, 2, 3, 4, 5, - - - when electrical power should be supplied to all of the CPU blade servers 1, 2, 3, 4, 5, - - -.

Fifth Embodiment

Figure 4:
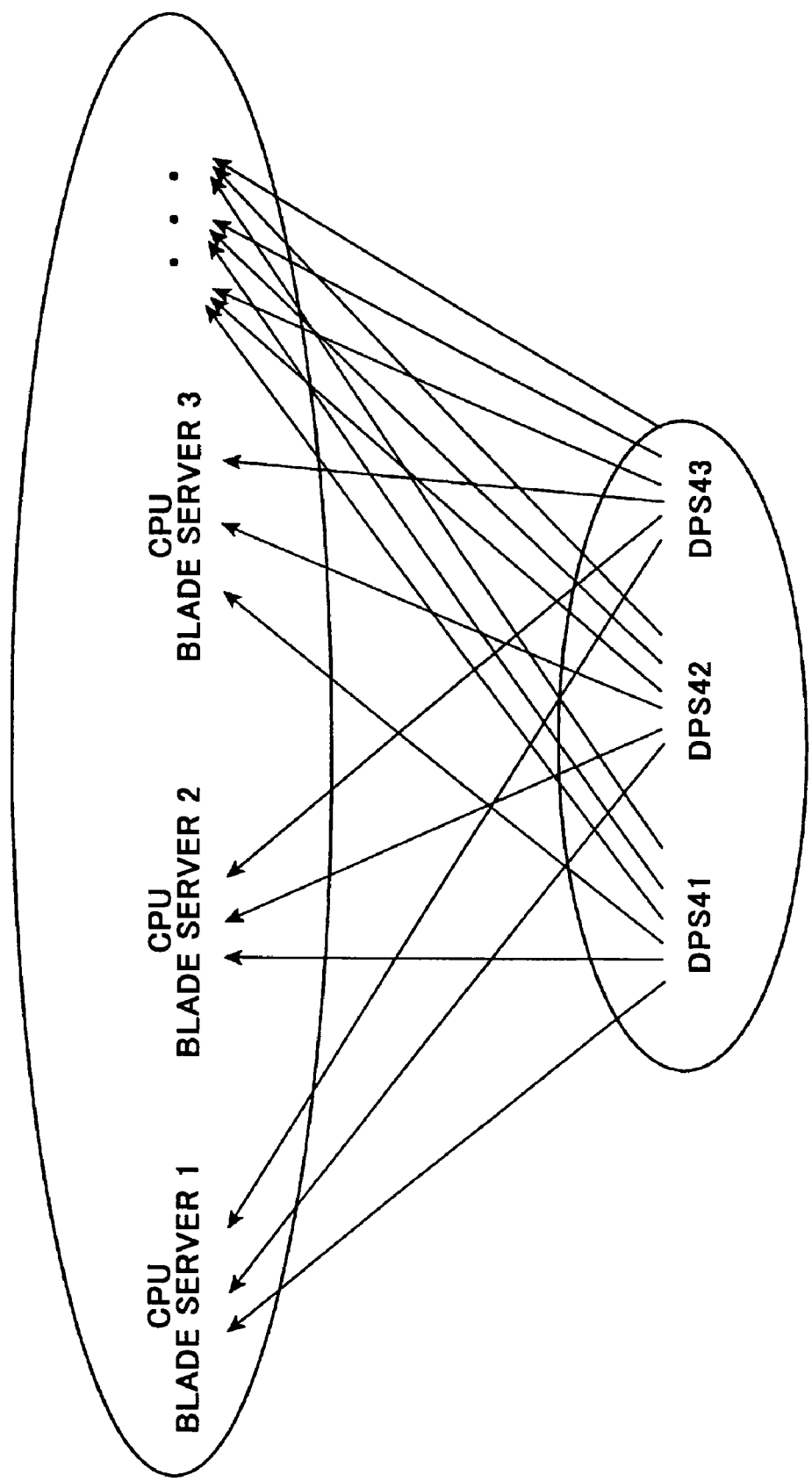
FIG. 4 is a schematic view illustrating power distribution in the fifth embodiment.

FIG. 4 is a schematic view illustrating power distribution in the fifth embodiment.

In the above-mentioned fourth embodiment, the CPU blade servers 1, 2, 3, 4, 5, - - - are grouped into the first group including the CPU blade servers 1 and 2, and the second group including the CPU blade servers 3, 4, 5, - - -, and the distributed power supply modules 41 to 43 are grouped into the first group including the distributed power supply module 41, and the second group including the distributed power supply modules 42 and 43. The distributed power supply module 41 belonging to the first group supplies electrical power to the CPU blade servers 1 and 2 belonging to the first group, and the distributed power supply modules 42 and 43 belonging to the second group supply electrical power to the CPU blade servers 3, 4, 5, - - - belonging to the second group. The fourth embodiment ensures is possible to avoid the cluster system 100 from stalling, even if there occurs a trouble in any one of the distributed power supply modules 41 to 43.

In contrast, in the fifth embodiment, each of the distributed power supply modules 41 to 43 is designed to supply electrical power to each of the CPU blade servers 1, 2, 3, 4, 5, - - -. The fifth embodiment ensures is possible to avoid the cluster system 100 from stalling, similarly to the fourth embodiment, even if there occurs a trouble in any one of the distributed power supply modules 41 to 43.

In the fifth embodiment, as illustrated in FIG. 5, the distributed power supply module 41 is designed to supply electrical power to all of the CPU blade servers 1, 2, 3, 4, 5, - - -, the distributed power supply module 42 is designed to supply electrical power to all of the CPU blade servers 1, 2, 3, 4, 5, - - -, and the distributed power supply module 43 is designed to supply electrical power to all of the CPU blade servers 1, 2, 3, 4, 5, - - -.

In the above-mentioned fourth embodiment, the CPU blade servers 1, 2, 3, 4, 5, - - - are grouped into the first group including the CPU blade servers 1 and 2, and the second group including the CPU blade servers 3, 4, 5, - - - , and the distributed power supply modules 41 to 43 are grouped into the first group including the distributed power supply module 41, and the second group including the distributed power supply modules 42 and 43. That is, each of the first and second groups of the CPU blade servers includes one or more CPU blade server(s), and each of the first and second groups of the distributed power supply modules includes one or more distributed power supply module(s).

In contrast, the CPU blade servers 1, 2, 3, 4, 5, - - - are grouped into a plurality of groups and the distributed power supply modules 41 to 43 are grouped into a plurality of groups in the fifth embodiment, similarly to the fourth embodiment. However, each of the groups of the CPU blade servers includes only one CPU blade server, and each of the groups of the distributed power supply modules includes only one distributed power supply module unlike the fourth embodiment.

Accordingly, even if there occurs a trouble in any one of the distributed power supply modules 41 to 43, for instance, in the distributed power supply module 41, the rest of the distributed power supply modules, that is, the distributed power supply modules 42 and 43 can keep supplying electrical power to the CPU blade servers 1, 2, 3, 4, 5, - - - .

Thus, even if there occurs a trouble in any one of the distributed power supply modules 41 to 43, through the performance of the cluster system 100 is deteriorated, it is possible to avoid the cluster system 100 from completely stalling, that is, to avoid all of the CPU blade servers 1, 2, 3, 4, 5, - - - used for actual operation of the cluster system 100 from stalling.

The above-mentioned first to third embodiments may be applied to the fifth embodiment. That is, even if there occurs a trouble in any one of the CPU blade servers 1, 2, 3, 4, 5, - - - used for actual operation of the cluster system 100, any one of the auxiliary the CPU blade servers 11, 12, - - - is used in place of the troubled CPU blade server.

In accordance with the fifth embodiment, the chassis management module in operation (for instance, the first chassis management module 21) causes each of the distributed power supply modules 41 to 43 to supply electrical power to each of the CPU blade servers 1, 2, 3, - - - .

Thus, only if the first and second chassis management modules 21 and 22 prepares a minimum ability for supplying power to the CPU blade servers, it would be possible to effectively supply electrical power to the CPU blade servers 1, 2, 3, 4, 5, - - - .

Even if there occurs a trouble in any one of the distributed power supply modules 41 to 43, resulting in that electrical power cannot be supplied to the CPU blade servers 1, 2, 3, - - - from the troubled distributed power supply module, the rest of the distributed power supply modules can keep supplying electrical power to the CPU blade servers 1, 2, 3, - - - . Thus, through the performance of the cluster system 100 may be deteriorated, it is possible to avoid the cluster system 100 from completely stalling, that is, to avoid all of the CPU blade servers 1, 2, 3, 4, 5, - - - used for actual operation of the cluster system 100 from stalling.

Thus, the fifth embodiment presents the cluster system 100 which is capable of operating with less electrical power, having a resistance to troubles, and presenting high reliability.

The fifth embodiment is suitable to a case in which the distributed power supply modules 41 to 43 can construct (N+1) redundancy for the CPU blade servers 1, 2, 3, 4, 5, - - - , that is, there is at least one distributed power supply module which does not supply electrical power to the CPU blade servers 1, 2, 3, 4, 5, - - - when electrical power should be supplied to all of the CPU blade servers 1, 2, 3, 4, 5, - - - .

Sixth Embodiment

The first and second chassis management modules 21 and 22 in the sixth embodiment are designed to select a power-supply way for supplying electrical power to the CPU blade servers 1, 2, 3, - - - , among the first power-supply way set forth in the above-mentioned fourth embodiment and the second power-supply way set forth in the above-mentioned fifth embodiment.

In order for the first and second chassis management modules 21 and 22 to be able to select the first or second power-supply way, each of the first and second chassis management modules 21 and 22 is designed to be able to check whether the distributed power supply modules 41, 42 and 43 construct (N+1) redundancy for the CPU blade servers 1, 2, 3, - - - , wherein N indicates a number of the CPU blade servers used for actual operation of the cluster system 100.

Specifically, the chassis management module in operation (for instance, the first chassis management module 21) judges whether there is at least one distributed power supply module 41, 42 or 43 which does not supply electrical power to the CPU blade servers 1, 2, 3, - - - used for actual operation of the cluster system 100, when electrical power should be supplied to all of the CPU blade servers 1, 2, 3, - - - .

The chassis management module in operation makes the above-mentioned judgment in accordance with a number of the distributed power supply modules, a power-supply ability of the distributed power supply modules 41-43, and a number of the CPU blade servers 1, 2, 3, - - - used for actual operation of the cluster system 100.

If the chassis management module in operation (for instance, the first chassis management module 21) judges that the distributed power supply modules (DPSs) 41, 42 and 43 construct (N+1) redundancy, that is, there is at least one distributed power supply module 41, 42 or 43 which does not supply electrical power to the CPU blade servers 1, 2, 3, - - - used for actual operation of the cluster system 100, when electrical power should be supplied to all of the CPU blade servers 1, 2, 3, - - - , the chassis management module in operation causes the distributed power supply modules (DPSs) 41, 42 and 43 to supply electrical power to the CPU blade servers 1, 2, 3, - - - in accordance with the second power-supply way.

In contrast, if the chassis management module in operation (for instance, the first chassis management module 21) judges that the distributed power supply modules (DPSs) 41, 42 and 43 cannot construct (N+1) redundancy, that is, there is no distributed power supply module 41, 42 or 43 which does not supply electrical power to the CPU blade servers 1, 2, 3, - - - used for actual operation of the cluster system 100, when electrical power should be supplied to all of the CPU blade servers 1, 2, 3, - - - , the chassis management module in operation causes the distributed power supply modules (DPSs) 41, 42 and 43 to supply electrical power to the CPU blade servers 1, 2, 3, - - - in accordance with the first power-supply way.

Thus, electrical power is supplied to the CPU blade servers 1, 2, 3, - - - in accordance with an appropriate power-supply way selected from the first and second power-supply ways.

As mentioned earlier, the chassis management module in operation (for instance, the first chassis management module 21), each time the CPU blade servers 1, 2, 3, - - - , 11, 12, 13, - - - is put into the blade chassis 30, recognizes it through the signal line 60. For instance, the chassis management module in operation can know a total number of the CPU blade servers 1, 2, 3, - - -, 11, 12, 13, - - -, based on the recognition.

The chassis management module in operation monitors whether electrical power is supplied to each of the CPU blade servers 1, 2, 3, - - -, 11, 12, 13, - - -.

In accordance with the sixth embodiment, since the first and second chassis management modules 21 and 22 are designed to be able to judge a redundancy of the distributed power supply modules 41, 42 and 43, the first and second chassis management modules 21 and 22 are able to cause the distributed power supply modules 41, 42 and 43 to supply electrical power to the CPU blade servers 1, 2, 3, - - - in accordance with an appropriate power-supply way selected from the first and second power-supply ways in dependence on the redundancy of the distributed power supply modules 41, 42 and 43.

Specifically, if the distributed power supply modules 41, 42 and 43 has a power-supply ability more than necessary, the first and second chassis management modules 21 and 22 cause the distributed power supply modules 41, 42 and 43 to supply electrical power to the CPU blade servers 1, 2, 3, - - - in accordance with the second power-supply way, whereas if the distributed power supply modules 41, 42 and 43 has a power-supply ability just necessary for operating the CPU blade servers, the first and second chassis management modules 21 and 22 cause the distributed power supply modules 41, 42 and 43 to supply electrical power to the CPU blade servers 1, 2, 3, - - - in accordance with the first power-supply way.

Thus, the distributed power supply modules 41, 42 and 43 and the CPU blade servers 1, 2, 3, - - - are appropriately grouped into groups in dependence on a redundancy of the distributed power supply modules 41, 42 and 43.

Thus, only if the first and second chassis management modules 21 and 22 prepares a minimum ability for supplying electrical power to the CPU blade servers 1, 2, 3, - - -, it would be possible to effectively supply electrical power to the CPU blade servers 1, 2, 3, 4, 5, - - -. Furthermore, there is accomplished the cluster system 100 which is capable of operating with less electrical power, having a resistance to troubles, and presenting high reliability.

In the above-mentioned first to sixth embodiments, the cluster system 100 is designed to include a plurality of the auxiliary CPU blade servers 11, 12, - - -. However, it should be noted that the cluster system 100 may be designed to include only one auxiliary CPU blade server.

A number of the CPU blade servers 1, 2, 3, - - - used for actual operation of the cluster system 100 is arbitrary, and a number of the distributed power supply modules 41, 42 and 43 is also arbitrary.

A number of groups into which the CPU blade servers and the distributed power supply modules are grouped in the fourth and sixth embodiments is arbitrary.

In the above-mentioned first to sixth embodiments, the cluster system 100 is designed to include CPU blade servers as blade servers to be power-controlled. The cluster system 100 may be designed to include switch blade servers or I/O blade servers in place of the CPU blade servers.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2005-094094 filed on Mar. 29, 2005 including specification, claims, drawings and summary is incorporated herein by reference in its entirety.

What is claimed is:

1. A cluster system comprising:
a plurality of blade servers including at least one auxiliary blade server, the rest of said blade servers being used for actual operation of said cluster system;
a power-supply unit capable of supplying electrical power to each of said blade servers;
a power-supply controller which controls on/off in supplying electrical power to each of said blade servers from said power-supply unit;
a blade server monitoring unit which monitors whether there occurs any trouble in each of said blade servers;
wherein said power-supply controller, when said blade server monitoring unit finds a trouble occurring in anyone of said blade servers used for actual operation of said cluster system, stops power-supply to a blade server in which said blade server monitoring unit found a trouble, from said power-supply unit, and turns said auxiliary blade server or anyone of auxiliary blade servers if said blade servers include two or more auxiliary blade servers, into a blade server to be used for actual operation of said cluster system, in place of said blade server in which said blade server monitoring unit found a trouble, wherein said power-supply unit is comprised of a plurality of power-supply devices, wherein a number of said blade servers used for actual operation of said cluster system is N,
said power-supply controller judges whether there is at least one power-supply device which does not supply electrical power to said blade servers when said power-supply unit supplies electrical power to said N blade servers, based on a number of said power-supply devices and a power-supply ability of said power-supply devices,
when said power-supply controller does not judge that there is at least one power-supply device which does not supply electrical power to said blade servers when said power-supply unit supplies electrical power to said N blade servers, said power-supply controller causes said power-supply unit to supply electrical power to said blade servers used for actual operation of said cluster system in a first power-supply way in which said power-supply controller groups said blade servers used for actual operation of said cluster system into at least two groups,
and further groups said power-supply devices into groups in a number identical with a number of and in association with said groups of said blade servers used for actual operation of said cluster system, and causes said power-supply device or devices belonging to a certain group to supply electrical power to said blade servers belonging to the associated group,
when said power-supply controller judges that there is at least one power-supply device which does not supply electrical power to said blade servers when said power-supply unit supplies electrical power to said N blade servers, said power-supply controller causes said power-supply unit to supply electrical power to said blade servers used for actual operation of said cluster system in a second power-supply way in which said power-supply controller causes each of said power-supply devices to supply electrical power to each of said blade servers used for actual operation of said cluster system.

2. The cluster system as set forth in claim 1, wherein said power-supply controller keeps said auxiliary blade server in a cool stand-by condition until said blade server monitoring unit finds a trouble in anyone of said blade servers, and, when said blade server monitoring unit found a trouble occurring in anyone of said blade servers used for actual operation of said cluster system, starts supplying electrical power to said auxiliary blade server in place of said blade server in which said blade server monitoring unit found a trouble.

3. The cluster system as set forth in claim 1, wherein said power-supply controller keeps said auxiliary blade server in a hot stand-by condition before said blade server monitoring unit finds a trouble in anyone of said blade servers.

4. A cluster system comprising:
a plurality of blade servers including at least one auxiliary blade server, the rest of said blade servers being used for actual operation of said cluster system;
a blade server monitoring unit which monitors whether there occurs any trouble in each of said blade servers;
a power-supply unit capable of supplying electrical power to each of said blade servers; and
a power-supply controller which controls on/off in supplying electrical power to each of said blade servers from said power-supply unit,
wherein said power-supply unit is comprised of a plurality of power-supply devices,
said power-supply controller causes each of said power-supply devices to supply electrical power to each of said blade servers,
wherein said power-supply controller, when said blade server monitoring unit finds a trouble occurring in anyone of said blade servers used for actual operation of said cluster system, stops power-supply to a blade server in which said blade server monitoring unit found a trouble, from said power-supply unit, and turns said auxiliary blade server or anyone of auxiliary blade servers if said blade servers include two or more auxiliary blade servers, into a blade server to be used for actual operation of said cluster system, in place of said blade server in which said blade server monitoring unit found a trouble.

5. A cluster system comprising:
a plurality of blade servers, wherein a number of said blade servers used for actual operation of said cluster system is N;
a power-supply unit capable of supplying electrical power to each of said blade servers; and
a power-supply controller which controls on/off in supplying electrical power to each of said blade servers from said power-supply unit,
wherein said power-supply unit is comprised of a plurality of power-supply devices,
said power-supply controller judges whether there is at least one power-supply device which does not supply electrical power to said blade servers when said power-supply unit supplies electrical power to said N blade servers, based on a number of said power-supply devices and a
power-supply ability of said power-supply devices,
when said power-supply controller does not judge that there is at least one power-supply device which does not supply electrical power to said blade servers when said power-supply unit supplies electrical power to said N blade servers, said power-supply controller causes said power-supply unit to supply electrical power to said blade servers in a first power-supply way in which said power-supply controller groups said blade servers into at least two groups, and
further groups said power-supply devices into groups in a number identical with a number of and in association with said groups of said blade servers, and causes said power-supply device or devices belonging to a certain group to supply electrical power to said blade servers belonging to the associated group,
when said power-supply controller judges that there is at least one power-supply device which does not supply electrical power to said blade servers when said power-supply unit supplies electrical power to said N blade servers, said power-supply controller causes said power-supply unit to supply electrical power to said blade servers in a second power-supply way in which said power-supply controller causes each of said power-supply devices to supply electrical power to each of said blade servers.

6. A method of controlling on/off in power-supply to a plurality of blade servers m a cluster system including a plurality of blade servers, and a power-supply unit capable of supplying electrical power to each of said blade servers, said plurality of blade servers including at least one auxiliary blade server, the rest of said blade servers being used for actual operation of said cluster system,
said method comprising:
monitoring whether there occurs any trouble in each of said blade servers used for actual operation of said cluster system;
when a trouble is found in anyone of said blade servers used for actual operation of said cluster system, stopping power-supply to a blade server in which said trouble was found;
turning said auxiliary blade server or anyone of auxiliary blade servers if said blade servers include two or more auxiliary blade servers, into a blade server to be used for actual operation of said cluster system, in place of said blade server in which said trouble was found, wherein said power-supply unit is comprised of a plurality of power-supply devices, wherein a number of said blade servers used for actual operation of said cluster system is N;
judging whether there is at least one power-supply device which does not supply electrical power to said blade servers when said power-supply unit supplies electrical power to said N blade servers, based on a number of said power-supply devices and a power-supply ability of said power-supply devices;
when it is not judged that there is at least one power-supply device which does not supply electrical power to said blade servers when said power-supply unit supplies electrical power to said N blade servers, causing said power-supply unit to supply electrical power to said blade servers in a first power-supply way in which said blade servers are grouped into at least two groups, and said power-supply devices are grouped into groups in a number identical with a number of and in association with said groups of said blade servers, and causing said power-supply device or devices belonging to a certain group to supply electrical power to said blade servers belonging to the associated group; and
when it is judged that there is at least one power-supply device which does not supply electrical power to said blade servers when said power-supply unit supplies electrical power to said N blade servers, causing said power-supply unit to supply electrical power to said blade servers in a second power-supply way in which each of said power-supply devices supplies electrical power to each of said blade servers.

7. The method as set forth in claim 6, further comprising:
keeping said auxiliary blade server in a cool stand-by condition until said blade a trouble is found in anyone of said blade servers used for actual operation of said cluster system; and when a trouble is found in anyone of said blade servers used for actual operation of said cluster system, starting supplying electrical power to said auxiliary blade server in place of said blade server in which said trouble was found.

8. The method as set forth in claim 6, further comprising keeping said auxiliary blade server in a hot stand-by condition before a trouble is found in any one of said blade servers used for actual operation of said cluster system.

9. A method of controlling on/off in power-supply to a plurality of blade servers in a cluster system including a plurality of blade servers, wherein a number of said blade servers is N, and a power-supply unit capable of supplying electrical power to each of said blade servers, said power-supply unit being comprised of a plurality of power-supply devices, said method comprising:

judging whether there is at least one power-supply device which does not supply electrical power to said blade servers when said power-supply unit supplies electrical power to said N blade servers, based on a number of said power-supply devices and a power-supply ability of said power-supply devices;

when it is not judged that there is at least one power-supply device which does not supply electrical power to said blade servers when said power-supply unit supplies electrical power to said N blade servers, causing said power-supply unit to supply electrical power to said blade servers in a first power-supply way in which said blade servers are grouped into at least two groups, and said power-supply devices are grouped into groups in a number identical with a number of and in association with said groups of said blade servers, and causing said power-supply device or devices belonging to a certain group to supply electrical power to said blade servers belonging to the associated group; and when it is judged that there is at least one power-supply device which does not supply electrical power to said blade servers when said power-supply unit supplies electrical power to said N blade servers, causing said power-supply unit to supply electrical power to said blade servers in a second power-supply way in which each of said power-supply devices supplies electrical power to each of said blade servers.

10. A memory storing a program for causing a computer to carry out a method of controlling power-supply to a plurality of blade servers in a cluster system including a plurality of blade servers, and a power-supply unit capable of supplying electrical power to each of said blade servers, said plurality of blade servers including at least one auxiliary blade server, the rest of said blade servers being used for actual operation of said cluster system, wherein steps executed by said computer in accordance with said program includes:

monitoring whether there occurs any trouble in each of said blade servers used for actual operation of said cluster system;

when a trouble is found in anyone of said blade servers used for actual operation of said cluster system, stopping power-supply to a blade server in which said trouble was found;

turning said auxiliary blade server or anyone of auxiliary blade servers if said blade servers include two or more auxiliary blade servers, into a blade server to be used for actual operation of said cluster system, in place of said blade server in which said trouble was found, wherein a number of said blade servers used for actual operation of said cluster system is N;

judging whether there is at least one power-supply device which does not supply electrical power to said blade servers when said power-supply unit supplies electrical power to said N blade servers, based on a number of said power-supply devices and a power-supply ability of said power-supply devices;

when it is not judged that there is at least one power-supply device which does not supply electrical power to said blade servers when said power-supply unit supplies electrical power to said N blade servers, causing said power-supply unit to supply electrical power to said blade servers in a first power-supply way in which said blade servers are grouped into at least two groups, and said power-supply devices are grouped into groups in a number identical with a number of and in association with said groups of said blade servers, and causing said power-supply device or devices belonging to a certain group to supply electrical power to said blade servers belonging to the associated group; and when it is judged that there is at least one power-supply device which does not supply electrical power to said blade servers when said power-supply unit supplies electrical power to said N blade servers, causing said power-supply unit to supply electrical power to said blade servers in a second power-supply way in which each of said power-supply devices supplies electrical power to each of said blade servers.

11. A memory storing a program for causing a computer to carry out a method of controlling power-supply to a plurality of blade servers in a cluster system including a plurality of blade servers, wherein a number of said blade servers is N, and a power-supply unit capable of supplying electrical power to each of said blade servers, said power-supply unit being comprised of a plurality of power-supply devices, wherein steps executed by said computer in accordance with said program includes:

judging whether there is at least one power-supply device which does not supply electrical power to said blade servers when said power-supply unit supplies electrical power to said N blade servers, based on a number of said power-supply devices and a power-supply ability of said power-supply devices;

when it is not judged that there is at least one power-supply device which does not supply electrical power to said blade servers when said power-supply unit supplies electrical power to said N blade servers, causing said power-supply unit to supply electrical power to said blade servers in a first power-supply way in which said blade servers are grouped into at least two groups, and said power-supply devices are grouped into groups in a number identical with a number of and in association with said groups of said blade servers, and causing said power-supply device or devices belonging to a certain group to supply electrical power to said blade servers belonging to the associated group; and when it is judged that there is at least one power-supply device which does not supply electrical power to said blade servers when said power-supply unit supplies electrical power to said N blade servers, causing said power-supply unit to supply electrical power to said blade servers in a second power-supply way in which each of said power-supply devices supplies electrical power to each of said blade servers.

* * * * *